RICHARD MacDUFF
INVENTOR

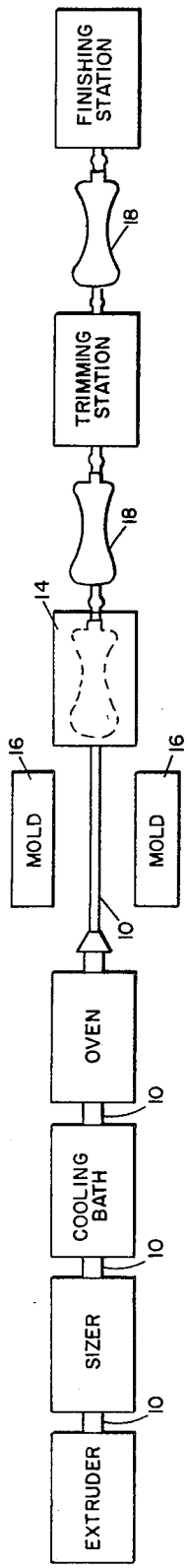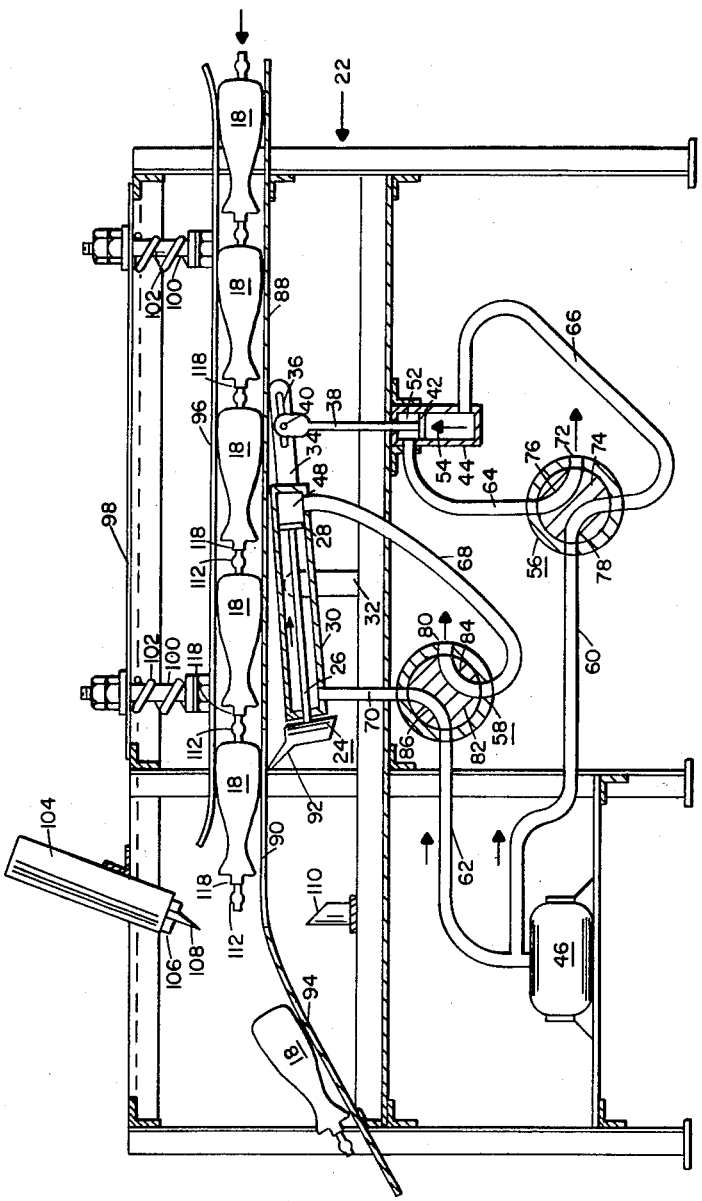

BY Shelden F. Rages
ATTORNEY

United States Patent Office 3,704,188
Patented Nov. 28, 1972

3,704,188
TRIMMING FLASH WITH ULTRASONIC TOOL
Richard MacDuff, Newark, Del., assignor to Hercules Incorporated, Wilmington, Del.
Filed Dec. 30, 1970, Ser. No. 102,693
Int. Cl. B29c 27/08; B32b 31/18
U.S. Cl. 156—73                3 Claims

ABSTRACT OF THE DISCLOSURE

The invention is concerned with trimming the flash from a pinch area in a recessed portion in the bottom of a thermoplastic container which is connected to a chain of containers each of which is attached to each other by the flash. The trimming is effected by moving and vibrating the cutting edge of an ultrasonic horn into contact with the pinch and cutting through the pinch while the container is loosely supported.

---

It is an object of this invention to trim flash from a pinch area of a thermoplastic container without destroying the area around the pinch and wherein the pinch area is located within a recessed portion and the flash interconnects the container with a chain of containers.

Other objects of this invention will be apparent from the following description with reference to the drawings wherein:

FIG. 1 is a process flow diagram;

FIG. 2 is a view of a mechanism for conveying containers to a trimming station at the return stroke position;

Figure 3:
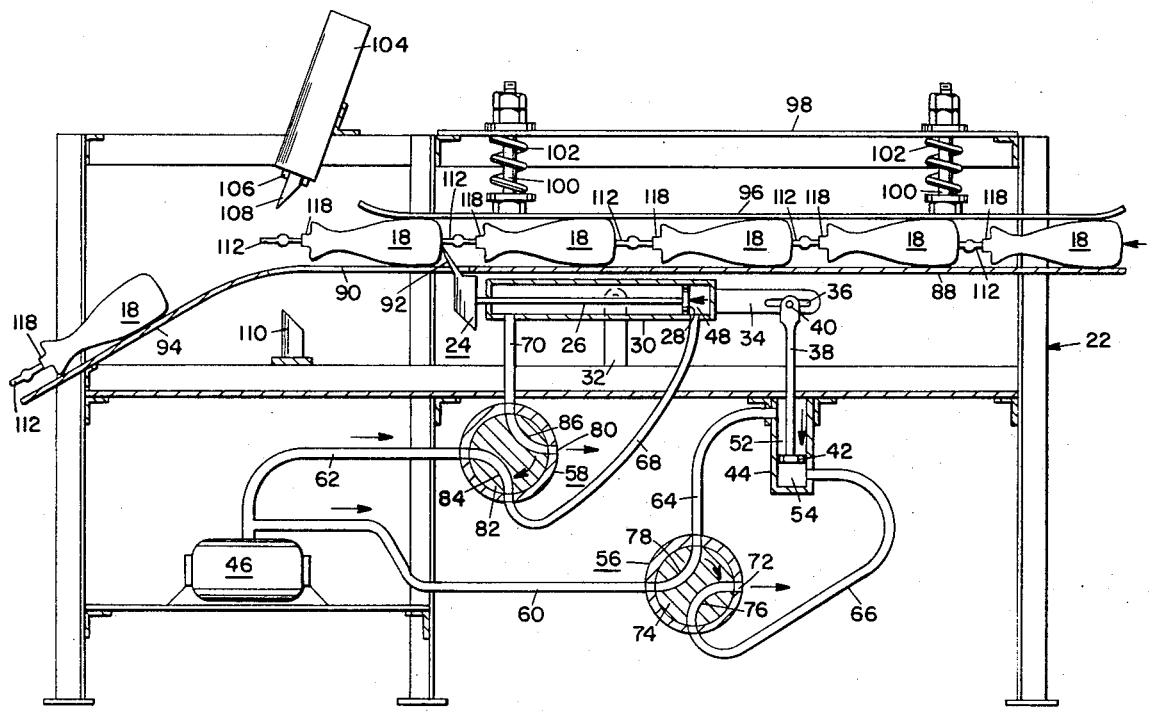
FIG. 3 is a view of the conveying mechanism of FIG. 2 in a container engaging position.

Referring to the flow diagram of FIG. 1, an extruder is utilized to extrude a polypropylene tube 10. The tube passes through a sizer and then a cooling bath where the tube is cooled below the crystalline temperature. In the case of polypropylene, the tube is cooled to about 120° C. to hasten crystallization. The tube 10 is drawn from the extruder through the sizer and cooling bath by a driven set of opposed tires (not shown). The tube 10 is reheated in an oven to a few degrees below the crystalline melting point (about 140° C.–167° C.) and after being reheated, passes through a restriction cone 12 to a pair of molds 14 and 16 which alternately grip the tube 10 and move away from the oven to stretch the same through the cone 12 to orient the tube. Mold 14 grips the tube 10 and moves away from the oven to stretch and orient the tube 10. While the tube is being stretched by mold 14, the mold 16 opens and moves toward the oven and stops adjacent the stretched tube and closes on the tube to grip the same and moves away from the oven to stretch a new portion of the tube 10 emerging from the oven. When mold 16 closes, mold 14 stops and opens to discharge a bottle 18 and then moves toward the oven to repeat the cycle. Each of the molds is communicated with a source of pressure which is utilized to expand the tube inside the mold to form the container 18. The container 18 proceeds to a trimming station where it is separated from the other containers and the flash removed. From the trimming station, the individual bottles are then sent to a finishing station where the neck of the bottle is trimmed and bored to final size.

The invention is directed to the technique for trimming the flash from the pinch located in a recessed area of the bottom of the bottle and will be described in detail. The remaining functions described above are well known.

Figure 4:
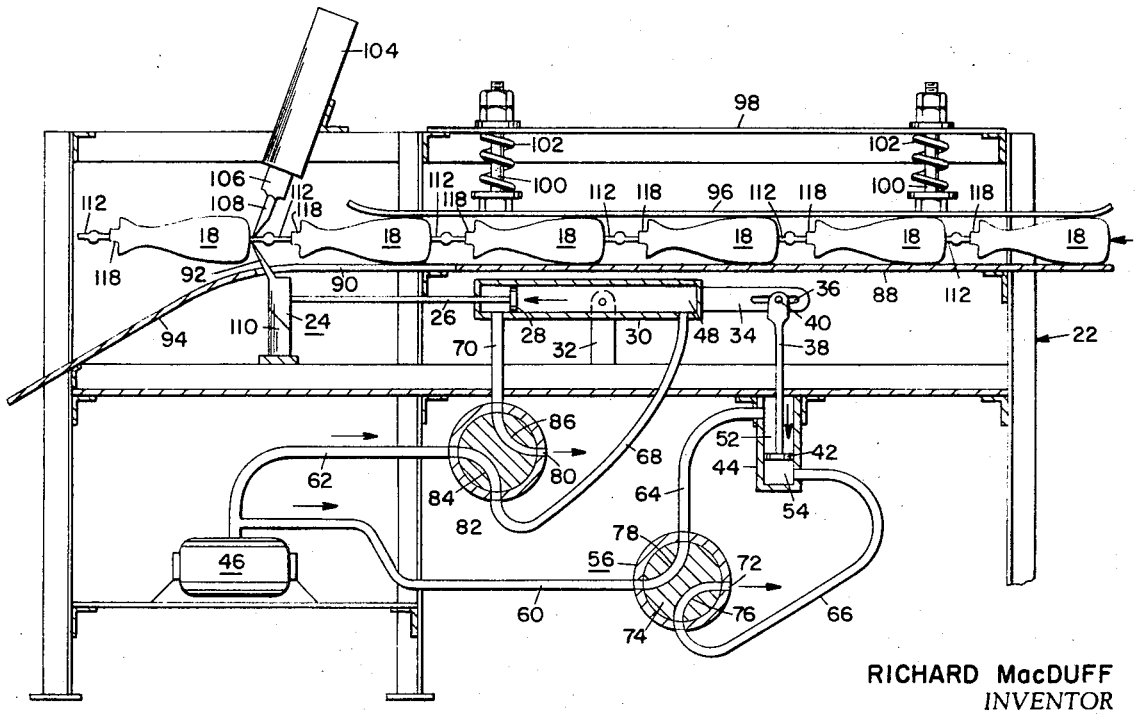
FIG. 4 is a view of the conveying mechanism of FIG. 2 at a container trim position.

Referring to FIGS. 2–4, the trimming station comprises a support structure 22. A movable anvil 24 is fixedly secured to a piston rod 26 which extends from a piston 28 slidingly received in a cylinder 30. The cylinder 30 is pivotally mounted to a pair of fixed bars 32 (one shown) which straddle the cylinder and has an extension 34, with a slot 36 therein, which is slidingly interconnected to a piston rod 38 by a pin 40 received in the slot 36. The piston rod 38 extends from a piston 42 which is received in cylinder 44 fixedly mounted by any suitable means to the support structure 22. A pressure accumulator 46 is mounted on the support structure 22 and provides pressure for actuating the pistons 28 and 42. The piston 28 divides the cylinder 30 into a forwarding chamber 48 and a return chamber 50 and piston 42 divides the cylinder 44 into a forwarding chamber 52 and a return chamber 54. The accumulator 46 is communicated to a pair of valves 56 and 58 by conduits 60 and 62, respectively. The valve 56 is connected to chambers 52 and 54 by conduits 64 and 66, respectively, and the valve 58 is communicated with the chambers 48 and 50 by conduits 68 and 70, respectively. The valve 56 has an exhaust port 72 and a rotary member 74 containing passages 76 and 78 therein for selectively communicating the various conduits with pressure or exhaust. The valve 58 has an exhaust port 80 and a rotary member 82 containing passages 84 and 86 therein for selectively communicating the various conduits with pressure or exhaust.

A combined bottle support plate and chute 88 is fixedly secured to the support 22 and has an elongated slot 90 for slidably receiving the tip 92 of the anvil 24 therein. The front part 94 of the plate 88 is sloped and serves as a discharge chute for the separated bottles. A brake plate 96 is secured to a plate 98 of the support 22 for vertical movement relative thereto by pins 100 which are slidably received in the plate 98. A coil spring 102 surrounds each pin and is compressed between the plates 96 and 98 to urge the braking plate 96 into engagement with a chain of bottles 18 to retain the same in position.

Mounted to the structure 22 is a well-known commercial ultrasonic welder 104 comprising a horn 106 having a cutting tip 108. A stop 110 is secured to the support 22 and is positioned for engagement by anvil 24 to stop the anvil when the tip 92 of the anvil is aligned with the horn 106 as shown in FIG. 4.

Figure 5:
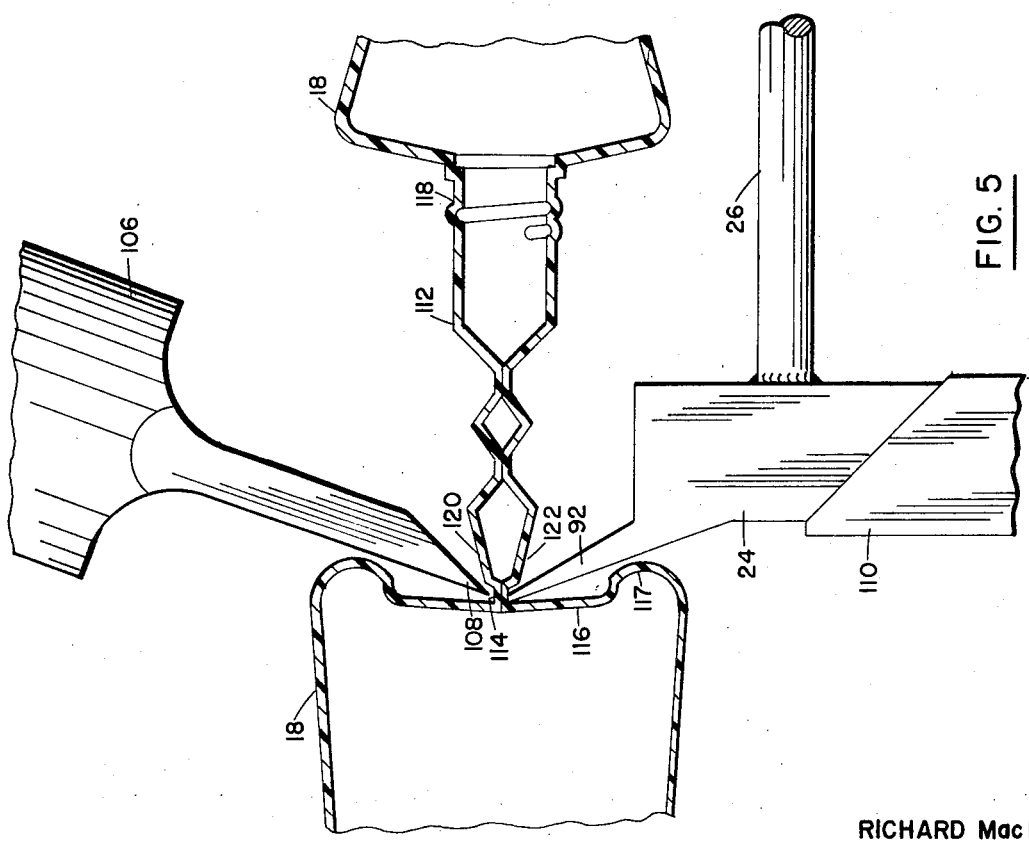
FIG. 5 is an enlarged view of flash being cut from the pinch area in a recessed portion of the bottom of the container.

Referring to FIG. 5, the bottles 18 are joined by crystalline polypropylene waste material or flash 112 extending from a pinch 114 in a recess 116, defined by a rim 117, at the bottom of the bottle to the neck 118 of the adjacent bottle at the rear thereof. The flash also includes sloped surfaces 120 and 122 adjacent the pinch 114.

In operation, the passage 78 of the rotary member 74 of valve 56 is positioned to communicate the pressure in the accumulator 46 and passages 60 with passage 64 and the chamber 52 to actuate the piston 42 and piston rod 38 downward to raise the anvil 24 through the slot 90 and engage the bottom rim 117 of the lead bottle 18 which is at a "lead rest" position. The other chamber 54 is communicated to exhaust by passages 66 and 76 and port 72. The rotary member 82 is actuated to position the passage 84 to communicate the pressure in the accumulator 46 and the passage 62 with passage 68 and chamber 48 to actuate the piston 28 and piston rod 26 forward and thus the chain of bottles 18 until the anvil 24 abuts the stop 110 thereby moving the lead bottle from the "lead rest" position to a flash cut-off position and moving the adjacent trailing bottle into the "lead rest" position. The other chamber 50 is communicated to exhaust by passages 70 and 86 and port 80.

Figure 6:
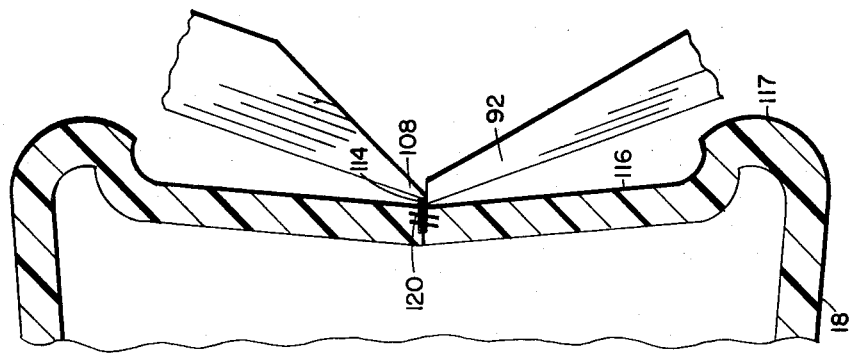
FIG. 6 is an enlarged view of the pinch area after the flash has been cut therefrom.

When the anvil 24 is stopped, the ultrasonic tool is energized moving the edge 108 of the horn 106 into contact with the flash 112 at the pinch 114 (FIG. 5). If flash is not aligned properly with the edge 108, the edge 108 will engage the sloped surface 120 and force (by sliding camming action) the bottle slightly rearward until the edge 108 is properly positioned against the pinch 114. At the point in the process, the bottle 18 is freely suspended with the sole support for the bottle 26 being the anvil tip 92, the horn 106 and the flash 112. Thus, the bottle is free to move in response to vibrations imparted thereto. The horn 106 is then vertically vibrated until the edge 108 cuts through the pinch 114 and engages the anvil tip 92. As the ultrasonic horn melts through the pinch 114, the pinch heat seals adjacent the cut area as shown by the reference numeral 120 in FIG. 6. In many instances the pinch fails to heat seal during the molding of the bottle and the seal effected during the trimming of the flash therefrom provides for a definite heat seal at the pinch. The bottle then falls down the chute 94 onto a conveyor (not shown) and taken to the finishing station. After the bottle 18 is severed from the flash 112, the brake plate 96 maintains the remaining bottles in position due to the force of the springs 102 acting to press the bottles against the plate 88. The rotary valve member 74 is then energized to position passage 78 to communicate the chamber 54 and conduit 66 to the pressure conduit 60 and accumulator 46. The other chamber 52 and conduit 64 are communicated to the exhaust port 72 by passage 76. The rotary valve member 82 is moved simultaneously with the valve member 74 to position the passage 86 to communicate with conduit 70 and chamber 50 to the pressure conduit 62 and accumulator 46. The other chamber 48 and conduit 68 are communicated to the exhaust port 80 by passage 84. This results in the piston 42 and piston rod 38 moving upward to pivot the cylinder 30 in a counterclockwise direction moving the anvil 24 downward to a position in which the anvil can return to its conveying position without striking the bottles. The pressure in chamber 50 moves the piston 28 and piston rod 26 rearward to the position as shown in FIG. 2 where the valves are again energized to activate the pistons 42 and 28 whereby the previously described functions are repeated.

The ultrasonic tools can be a well-known commercial tool such as the ultrasonic welder sold by Branson Sonic Power which vibrates the horn at 20,000 cycles per second.

The electrical system for carrying out the sequence of operation just described has not been shown but it should be understood that such a system would comprise well-known limit switches or timers and a simple electrical circuit for actuating the valves and the ultrasonic tool.

The use of the ultrasonic tool has distinct advantages over other known methods for removing flash. A problem is not only presented due to the pinch being in a recessed portion of the bottom of the bottle, but also since the flash interconnects two bottles thereby affecting maneuverability of cutting tools. If the horn 106 engages the bottom rim 117 of the recessed area 116 of the bottle, no heat is conveyed to the bottle in those areas since the horn is at room temperature and the bottle is not confined against movement. This is true since heat is generated only in an area engaged by the cutting edge of the horn and confined against movement. If a hot knife is used, the knife would have to be heated to a temperature substantially above the crystalline melting point of the polypropylene bottle in order to keep enough heat at the tip of the knife to be able to cut through the pinch. If this knife should engage any portion of the bottle, then the bottle could be damaged. It would be with great difficulty to prevent engagement between a hot knife and the bottle and therefore the use of the ultrasonic tool has its distinct advantages.

While the tube has been described as being polypropylene, any thermoplastic material may be utilized, but preferred are solid polymers of crystalline mono-α-olefins containing up to 6 carbon atoms which have high degrees of crystallinity, for example, in addition to isotactic polypropylene are high density ethylene polymers, poly-4-methyl-pentene-1, polybutene and the like. Furthermore, the bottles do not have to be oriented.

What I claim and desire to protect by Letters Patent is:

1. A method of trimming flash from a pinch area of a thermoplastic container comprising: providing a plurality of containers each interconnected by waste material, each of said containers having a pinch in a recessed portion thereof from which the waste material extends, moving an anvil tip into the recessed portion of the leading one of said plurality of containers which is at a lead rest position and moving said anvil and thereby said leading container from its lead rest position to a flash cut-off position where the tip portion of the anvil is aligned with a cutting edge of an ultrasonic horn and engages one face of the waste material at the pinch, said movement of said leading container to said flash cut-off position causing a corresponding movement of the adjacent trailing container to the lead rest position, moving and energizing a vertically vibrating ultrasonic horn into the recess and cutting through the waste material at the pinch until said cutting edge engages the anvil while supporting said container in a manner to permit movement thereof if the horn should engage the container whereby heat will only be concentrated on that portion of the waste material supported by the anvil, and thereafter moving the anvil tip into the recessed portion of said adjacent trailing container in the lead rest position.

2. A method as recited in claim 1 wherein said container is a bottle and said thermoplastic polymer is a crystalline mono-α-olefin.

3. A method as recited in claim 1 wherein said container is a bottle and said thermoplastic polymer is crystalline polypropylene.

References Cited
UNITED STATES PATENTS

| | | | |
|---|---|---|---|
| 3,457,132 | 7/1969 | Tuma et al. | 156—73 X |
| 3,468,202 | 9/1969 | Hollis | 83—557 X |
| 3,469,076 | 9/1969 | Saslawsky | 83—914 X |
| 2,501,833 | 3/1950 | Webb et al. | 264—150 X |
| 3,542,618 | 11/1970 | Vaughn | 264—150 X |
| 2,651,148 | 9/1953 | Carwile | 156—73 UX |
| 2,307,424 | 1/1943 | Savage | 156—73 UX |
| 2,724,666 | 11/1955 | Myers | 156—73 X |
| 3,458,897 | 8/1969 | Roger | 83—914 X |
| 3,533,132 | 10/1970 | Rupert et al. | 83—914 X |
| 3,520,021 | 7/1970 | Waechter et al. | 83—914 X |

WILLIAM D. MARTIN, Primary Examiner

B. D. PIANALTO, Assistant Examiner

U.S. Cl. X.R.

83—557, 914; 264—148, 150